March 25, 1924.
E. C. ORR
CIRCULAR SAW GRINDER
1,488,056
Filed July 18, 1921
2 Sheets-Sheet 1
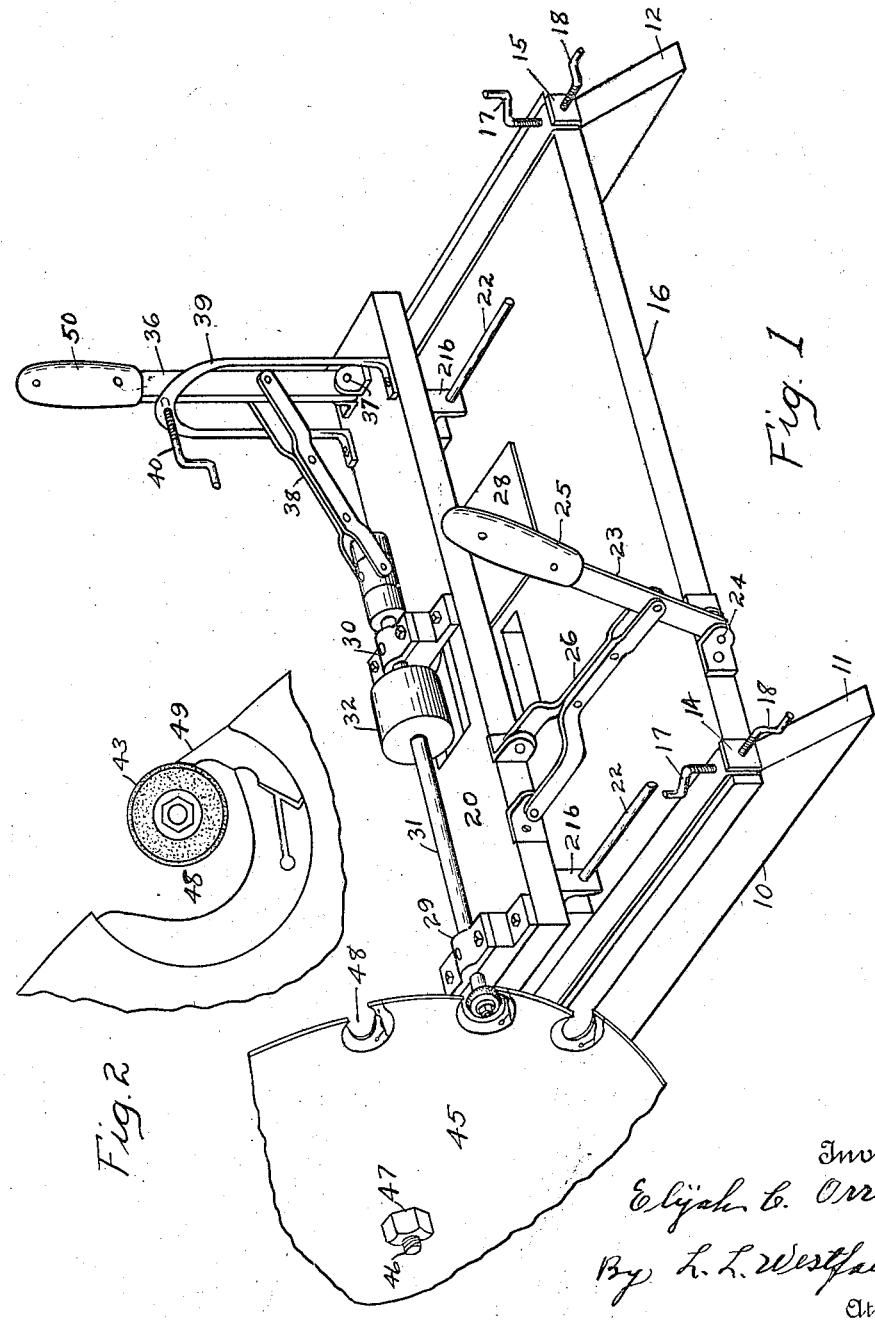

March 25, 1924.

E. C. ORR 1,488,056

CIRCULAR SAW GRINDER

Filed July 18, 1921

Inventor
Elijah C. Orr
By L. L. Westfall
Attorney

Patented Mar. 25, 1924.

1,488,056

UNITED STATES PATENT OFFICE.

ELIJAH C. ORR, OF DEER PARK, WASHINGTON.

CIRCULAR-SAW GRINDER.

Application filed July 18, 1921. Serial No. 485,418.

*To all whom it may concern:*

Be it known that I, ELIJAH C. ORR, citizen of the United States of America, residing at Deer Park, Spokane County, State of Washington, have invented new and useful Improvements in Circular-Saw Grinders, of which the following is a specification.

This invention pertains to means for the grinding, sharpening and aligning of the teeth of circular saws and has for its object to provide a mechanical means for uniformly sharpening and aligning of the teeth in the blade of a circular saw in order to get a saw of the kind mentioned in the best possible condition and in order to rebuild and rejuvenate the saw.

I accomplish these purposes by the mechanism hereinafter particularly described, pointed out in the claims and illustrated in the accompanying drawings.

Figure 1 is a perspective view of the device showing the application thereof, there being shown a broken-away portion of a circular saw blade, the grinder being shown as applied to grind one of the teeth.

Figure 2 is an enlarged view of a broken-away portion of a circular saw blade and the grinder, showing the application of the grinder to one of the teeth.

Figure 4:
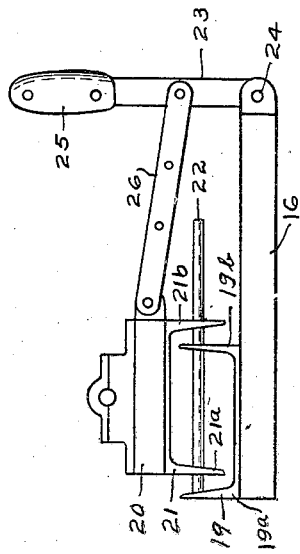
Figure 4 is an end elevation of the platform and table, showing means for the lateral adjustment of the table with relation to the platform.
Figure 3:
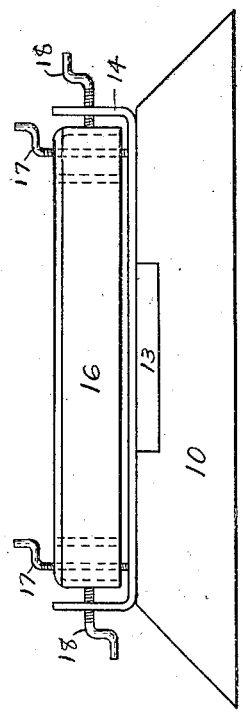
Figure 3 is an enlarged end elevation of the stand and platform, showing means for the vertical and lateral adjustment of the platform with relation to the stand.
Figure 5:
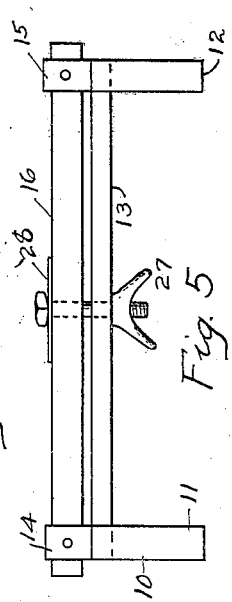
Figure 5 is a side elevation of the platform and stand, showing the manner of fastening the two together
Figure 6:
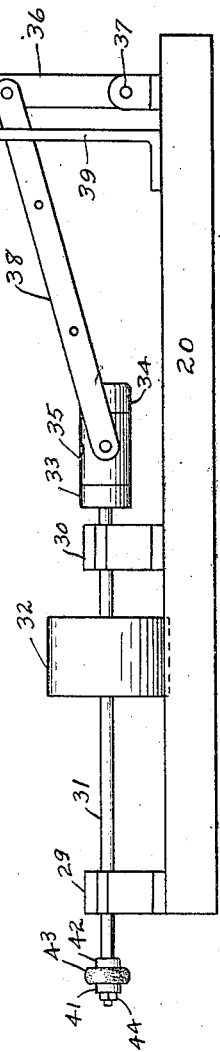
Figure 6 is an enlarged side elevation of the table.

In a detail description in which like numerals refer to like parts throughout the several views, the stand 10 comprises two uprights 11 and 12, a transversely arranged connecting member 13 and two brackets 14 and 15, one each surmounting the uprights 11 and 12. The platform 16 is mounted in the brackets 14 and 15 and is vertically adjustable therein by means of the screws 17 passing through the platform 16 and bearing against the brackets 14 and 15 and laterally adjustable therein by means of the screws 18 passing through the brackets 14 and 15 and bearing against the platform 16.

Mounted on the platform 16 are brackets 19 and extending downwardly from the table 20 are brackets 21, with the arms $21^a$ of the brackets 21 extending downwardly between the arms $19^a$ and $19^b$ of the brackets 19 and the arm $21^b$ outside the arms $19^b$ of the brackets 19. Rods 22 are rigidly secured in the arms $19^a$ and $19^b$ of the bracket 19 and the arms $21^a$ and $21^b$ of the brackets 21 are made slidable thereon in the positions above described and as shown in Figure 4. A lever 23 is fulcrumed to the platform 16 at 24 and is provided with a handle 25. The lever 23 is pivotally secured to the table 20 by a bifurcated arm 26. By means of this connection the table 20 is laterally adjustable upon the rods 22 by the manual operation of the lever 23. The stand 10 and the platform 16 are secured together by means of an adjustable bolt 27 passing through the platform 16 and the cross member 13, the bolt 27 passing through a plate 28 on the platform 16, the plate 28 being for the usual protecting purposes.

Transversely arranged on the table 20 are bearings 29 and 30 in which is rotatably and slidably mounted a shaft 31. Rigidly secured to the shaft 31 is a pulley 32 and two rollers 33 and 34, the rollers 33 and 34 being spaced apart and between which is loosely mounted on the shaft 31, a sleeve 35. Mounted on one end of the table 20 is a lever 36 fulcrumed thereto at 37. A bifurcated arm 38 pivotally connects the lever 36 and the sleeve 35. At a position on the table 20 inwardly from the lever 36 is secured a standard 39 through which extends a screw 40 adapted to bear against the lever 36 and to regulate the inward movement of the lever 36. The lever 36 is provided with a handle 50. The end of the shaft 31 extends outwardly beyond the bearing 29 and has rigidly mounted thereon between collars 41 and 42, a grinder 43 of a suitable material, such as carborundum and held in position by a nut 44.

In the practical application of the device, the same is placed upon a bench and the saw 45 rotatably mounted adjacent thereto in such a manner that the saw can be firmly held and adjusted from time to time as the different teeth are being sharpened, as by a bolt 46 extending through the eye thereof and into the bench (not shown) upon which the device rests and made firm by a nut 47 on the bolt 46. By means of the screw 40 the inward movement of the lever 36 is gauged so that the grinder 43 will extend into the throat 48 of the saw 45 to the proper position to grind the tooth 49 as shown in Figure 2. A belt on the pulley 32 reaching to a source of power rotates the shaft 31 and the grinder 43 and by the manual operation of the lever 23, the table 20 is adjusted backward and forward on the rods 22 as the grinder 43 is being rotated at high speed and the tooth 49 given the proper edge.

I have found it preferable to have the grinder 43 convex as shown in order to hollow-grind the tooth 49, so that the edges of the tooth will extend out beyond the center thereof and cut the wood in advance of the digging thereof. The adjustment of the platform 16 by means of the screws 17 and 18 is provided for in furtherance of the purpose to obtain a perfect adjustment of the grinder 43 to the saw tooth 49. By the adjustment of the lateral movement of the grinder 43 by means of the lever 36 and the use of a large grinder 43 whereby the sides thereof may be used for grinding purposes, the sides of the teeth of the saw 45 may be ground as desired and all of the teeth ground to perfect lateral alignment.

What is claimed is:—

1. A circular saw grinder comprising a rotary grinding member, a rotatable shaft upon which said rotary grinding member is mounted, a sleeve engaging the shaft, a lever connected with such sleeve, as a means for adjusting the shaft, a table upon which said construction is mounted, a platform upon which said table is adjustable and inter-engaging rods between the table and the platform, serving as guides in the adjustment of the table with relation to the platform.

2. A circular saw grinder comprising a rotary grinding member, a rotatable and slidable shaft upon which said rotary grinding member is mounted, a sleeve engaging the shaft, a lever connected with such sleeve as a means for adjusting the shaft, a table upon which said construction is mounted, a platform upon which said table is adjustable and a stand upon which said platform rests and upon which the same is vertically and laterally adjustable.

3. A circular saw grinder comprising a rotary grinding member, a rotatable and slidable shaft upon which said rotary grinding member is mounted, a sleeve engaging the shaft, a lever connected with such sleeve, as a means for adjusting the shaft, a table upon which said construction is mounted, a platform upon which said table is adjustable and a stand upon which said platform rests and upon which the same is vertically and laterally adjustable, the same being adjustable vertically by means of screws passing through the platform and bearing against the stand and brackets attached to said stand and screws passing through the brackets and bearing against the edges of the platform, by means of which the platform is adjustable laterally.

In testimony whereof, I affix my signature.

ELIJAH C. ORR.